United States Patent [19]

Mack et al.

[11] 4,371,455
[45] Feb. 1, 1983

[54] SUPPORTED CATALYST FOR OLEFIN POLYMERIZATION

[75] Inventors: Mark P. Mack; Charles T. Berge, both of Ponca City, Okla.

[73] Assignee: Conoco, Inc., Ponca City, Okla.

[21] Appl. No.: 332,417

[22] Filed: Dec. 21, 1981

[51] Int. Cl.³ ............................ C08F 4/02; C08F 4/64
[52] U.S. Cl. .................................. 252/429 C; 526/125
[58] Field of Search ..................................... 252/429 C

[56] References Cited

U.S. PATENT DOCUMENTS

| | | | |
|---|---|---|---|
| 3,801,558 | 4/1974 | Fletcher et al. | 252/429 C X |
| 4,113,654 | 9/1978 | Mayr et al. | 252/429 C |
| 4,194,075 | 3/1980 | Dietz et al. | 252/429 C X |
| 4,194,076 | 3/1980 | Dietz et al. | 252/429 C X |
| 4,325,840 | 4/1982 | Malpass | 252/429 C X |

Primary Examiner—Patrick Garvin
Attorney, Agent, or Firm—Cortlan R. Schupbach, Jr.

[57] ABSTRACT

A method for the preparation of supported Ziegler-Natta catalysts comprising the reduction of a transition metal compound with a magnesium containing reducing agent. The reducing agent is prepared in the presence of a magnesium chloride support utilizing an anhydrous and oxygen-free mixture of magnesium halide and magnesium metal, slurried in a hydrocarbon solvent. A halogenated hydrocarbon is added to activate the magnesium-containing reducing agent. Thereafter the transition metal compound is mixed with the slurry. The resulting solid is washed with a hydrocarbon solvent to eliminate residual transition metal compounds. The resulting washed solid is an active supported Ziegler-Natta olefin polymerization catalyst.

11 Claims, No Drawings

SUPPORTED CATALYST FOR OLEFIN POLYMERIZATION

This invention relates to olefin polymerization catalysts, catalyst supports, a process for preparing said olefin polymerization catalysts, and a process for polymerizing olefins. More specifically, this invention relates to a method for forming a supported activated catalyst suitable for olefin polymerization comprising reducing a transition metal with a magnesium-containing reducing agent which is prepared in the presence of a magnesium halide support.

Widespread commercial polymerization of olefins such as ethylene, propylene and 1-butylene are carried out in the presence of metallic catalysts, particularly the reaction products of organometallic compounds and transition metal compounds, to form substantially unbranched polymers of relatively high molecular weight. Typically, such polymerizations are carried out at relatively low temperatures and pressures. The resulting linear olefin polymers (e.g., high density polyethylene) are characterized by great stiffness and higher density than olefin polymers having highly branched chains.

Among the most widely utilized catalysts for producing linear olefin polymers are those initially described by Carl Ziegler in U.S. Pat. Nos. 3,113,115 and 3,257,332. These patents teach catalysts obtained by admixing a compound of a transition metal of groups IVb, Vb, VIb, VIIb and VIII of Mendeleev's Periodic Table of Elements with an organometallic compound. Commercially the halides and oxyhalides of titanium, vanadium, and zirconium are the most widely used transition metal compounds. Common examples of the organometallic compounds include hydrides, alkyls and haloalkyls of aluminum, alkyl aluminum halides, Grignard reagents, alkali metal aluminum hydrides, alkali metal borohydrides, alkaline earth metal hydrides, alkali metal hydrides and the like.

In commercial reactions, polymerization is carried out in a reaction medium comprising an inert organic liquid such as an aliphatic hydrocarbon and the catalysts of Ziegler. These catalysts when promoted with co-catalysts, are normally referred to as Ziegler-Natta catalysts and are the catalysts commonly used in commercial operations. One or more olefins are brought into contact with the catalyst and polymerization is allowed to proceed. Normally a molecular weight regulator such as hydrogen is present in the reaction vessel to control the molecular weight of the polymer formed.

After polymerization is complete, catalyst residue can be removed from the polymer by separating the polymer from the inert liquid diluent and repeatedly treating the polymer with an alchol or similar deactivating agent. The catalyst deactivation and/or removal procedures are expensive both in time and material as well as equipment, but are necessary if the catalyst residues are high in order to avoid degradation of the resulting polymer.

Most commercial systems employ a heterogeneous catalyst, where the catalyst is insoluble in the polymerization diluent. In forming catalysts of this type a transition metal is often reduced by a metal, metal alkyl or metal alkyl halide. In some cases the reducing agent becomes the support material when oxidized by reaction with a transition metal compound. Reduction of the transition metal compound by this method is important in that the reduced transition metal compound is surrounded by, or highly diluted, in the support material. The result is a highly dispersed transition metal compound on the supporting material.

It would therefore be highly desirable to provide a method for the formation of an olefin polymerization catalyst which allows a dispersion of the freshly prepared reducing agent within the support material. Such a process would provide a highly active catalyst by a convenient method.

It is therefore an object of the present invention to provide an improved method for obtaining an olefin polymerization catalyst. Other objects will become apparent to those skilled in the art as the description proceeds.

It has now been discovered according to the present invention that a highly active supported olefin polymerization catalyst can be formed by a method comprising (a) reacting magnesium metal with organic halide or halides which yields a dialkyl magnesium composition which is liquid or soluble in hydrocarbons, magnesium dihalide and unreacted magnesium metal; (b) separating the magnesium dihalide and magnesium metal from the dialkyl magnesium composition in the substantial absence of oxygen and moisture, then treating the magnesium dichloride and magnesium metal with alkyl halides or aryl halides or mixtures of these to form an organometallic substance in situ; (c) adding transition metal halides to the mixture of (b) or alternatively adding the mixture of (b) to transition metal halides, allowing reaction to occur and removing unreacted alkyl and aryl halides as well as unreacted transition metal halides before (d) adding alkylating agents to form a polymerization catalyst.

Of these two alternative methods, it is preferred that the slurry of (b) be added to the transition metal compound, since this method allows more control over the extent to which the transition metal compound is reduced. This improved control leads to better polymer yield, since excess reduction of the transition metal compounds to a low valence state reduces catalytic activity.

It is important that after completion of the reaction in step (c) the solid catalyst is washed several times with a liquid hydrocarbon to remove any unreacted quantities of reactants in the hydrocarbon soluble reaction products. Whenever desired, an aluminum alkyl co-catalyst used in step (d) can be employed by either adding to the catalyst or by adding separately to the polymerization reactor.

The catalyst provided in the present invention is most effective in polymerization processes utilizing alpha-olefins in polymerization reactions containing an inert diluent carried out under an inert atmosphere, relatively low temperature and pressure.

Olefins which are suitably polymerized or co-polymerized in the practice of this invention are generally aliphatic alpha-olefins having from 2 to 24 carbon atoms. Representative of such alpha-olefins are ethylene, propylene, butene-1, pentene-1, 4-methyl-pentene-1, 3-methyl-butene-1, octene-1, decene-1, hexene-1, octadecene-1, and the like. It is well known that alpha-olefins may be copolymerized with other alpha-olefins and/or with other ethylenically unsaturated monomers such as butadiene, pentadiene, 1,3-styrene, isoprene, alpha-methyl styrene, and similar ethylenically unsaturated monomers which do not destroy conventional Ziegler catalysts. Most benefits are realized in the polymerization of aliphatic alpha-monoolefins, especially ethylene and mixtures of ethylene in combination with up to about 10 weight percent of propylene, butene-1, octene-1, hexene-1, or other higher alpha-olefins based on the total monomer in the resultant polymer.

A preferred method of carrying out the process of the present invention is carrying out step (b) of the method in the presence of excess alkyl halides or aryl halides. Since excess quantities of alkyl halides and/or aryl halides will affect subsequent steps in the catalyst synthesis, when such excess materials are used, unreacted material must be removed as hereinafter described. These materials can be removed whenever convenient after step (b); however, these materials must be removed before step (d) in order to avoid adverse affects on catalytic activity and polymer properties.

In carrying out the method of the present invention, the magnesium metal used can be commercial grade magnesium turnings or shavings. It is preferred that a high surface area magnesium be utilized, which can be obtained by milling magnesium to a finely divided state. An example of a suitable state is a powder having a particle size of less than about 150 microns.

In carrying out the method of the present invention, step (a) is carried out by preparing a mixture of hydrocarbon soluble dialkyl magnesium compounds and undissolved solids containing magnesium dichloride and magnesium metal. Excess magnesium metal is reacted with materials such as ethyl chloride and with n-butyl chloride, either simultaneously or stepwise. This material, however, may be obtained commercially from Texas Alkyls, Inc. Deerpark Tex. Preparation of this material in any event is described in British Pat. No. 1,568,435. This patent clearly shows that two independently insoluble dialkyl magnesiums may solubilize one another.

Any organic halide which is used in step (a) of the process of the present invention must result in the formation of a dialkylmagnesium compound which is liquid and/or hydrocarbon soluble. Dialkyl magnesium compounds with straight chain alkyl groups of 5 carbon atoms and higher are soluble in solvents (*Journal of Organometallic Chemistry*, Volume 5, page 477, 1967; *Journal of Organometallic Chemistry*, Volume 64, page 25, 1974). Likewise, British Pat. No. 1,568,435 describes hydrocarbon soluble organomagnesium compounds containing straight chain alkyl group of less than 5 carbon atoms such as di-*n*-butyl magnesium and diethyl magnesium in an *n*-butyl to ethyl ratio of from 0.25 to 1 to about 4 to 1. Further, U.S. Pat. No. 4,127,507 describes soluble straight chain di(lower alkyl) magnesium compositions. These materials are all useful in the practice of the present invention when liquid or hydrocarbon soluble. Some dialkyl or diaryl magnesium compounds falling within the description given are not liquid or hydrocarbon soluble, and are not useful in the present invenion until they are rendered liquid or hydrocarbon soluble, such as by the methods described.

Representative but non-exhaustive examples of halides suitable for step (a) of the method of the present invention are selected from the group consisting of allyl bromide, allyl chloride, benzyl bromide, benzyl chloride, 1-bromobutane, 2-bromobutane, 1-bromodecane, 2-bromodecane, bromoethane, 1-bromoheptane, 1-bromohexane, 1-bromopentane, 2-bromopentane, 1-bromopropane, 2-bromopropane, 1-chlorobutane, 2-chlorobutane, 1-chlorodecane, 1-chlorooctane, 1-chloropropane, 2-chloropropane, 1-iodobutane, *m*-bromoanisole, *o*-bromoanisole, 9-bromoanthracene, 4-bromotoluene, 2-bromo-m-xylene, 4-bromo-*m*-xylene, 2-bromo-p-xylene, 3-bromo-*o*-xylene, 4-bromo-*o*-xylene, chlorobenzene, cyclopentylbromide, cyclopentylchloride, and cyclopropylbromide. These halides may not form liquid or hydrocarbon soluble dialkyl magnesium compounds when used alone, but these compounds can be made liquid or hydrocarbon soluble by mutual solubilization, as described in British Pat. No. 1,468,435.

In step (b) of the present method, magnesium dihalide and magnesium metal are separated from the dialkyl magnesium composition in the substantial absence of oxygen and moisture. These solids can be separated by filtration. Alternatively, the supernatant can be decanted from the material, since the magnesium dichloride and magnesium metal solids usually settle when stirring is discontinued.

Therefore, the preferred method of separation is filtration, followed by washing the solids with an inert hydrocarbon in the substantial absence of oxygen and moisture. Suitable hydrocarbons are aliphatic, cycloaliphatic and aromatic hydrocarbons. Representative but non-exhaustive examples of such hydrocarbons are *n*-pentane, iso-pentane, *n*-hexane, normal heptane, *n*-octane, iso-octane, gasoline, cyclohexane, methyl cyclohexane, cycloheptane, cyclooctane, benzene, toluene, xylene, ethyl benzene and tetralin.

When the separation is complete, the magnesium dichloride and magnesium metal are treated with alkyl halides or aryl halides or mixtures of these to form an organometallic substance in situ. Representative but non-exhaustive examples of suitable halides for step (b) of the method of the present invention are allyl bromide, allyl chloride, benzyl bromide, benzyl chloride, 1-bromobutane, 2-bromobutane, 1-bromodecane, 2-bromodecane, bromoethane, 1-bromoheptane, 1-bromohexane, 1-bromopentane, 2-bromopentane, 1-bromopropane, 2-bromopropane, 1-chlorobutane, 2-chlorobutane, 1-chlorodecane, 1-chlorooctane, 1-chloropropane, 2-chloropropane, 1-iodobutane, 1-iodopropane, 2-iodopropane, vinyl bromide, *o*-bromoanisole, *m*-bromoanisole, *p*-bromoanisole, 9-bromoanthracene, *p*-bromobenzamide, 4-bromotoluene, 2-bromo-*m*-xylene, 4-bromo-*m*-xylene, 2-bromo-*p*-xylene, 3-bromo-*o*-xylene, 4-bromo-*o*-xylene, chlorobenzene, cyclopentylbromide, cyclopentylchloride, and cyclopropylbromide.

In the preferred embodiment of the present invention excess halides above the level necessary for the reaction may be added to ensure complete reaction and to shorten reaction time. In addition, magnesium activating materials can be used, such as aluminum halides, aluminum halides in ether complexes, N,N-dimethylaniline, iodine and Grignard reagents. This activating reaction operates at temperatures of from about 20° C. to about 200° C., but preferably from about 20° C. to about 150° C.

Regardless of the use of a magnesium activating material, excess alkyl halides or aryl halides can be removed in step (b) and must be removed before step (d). This is usually accomplished by filtration followed by washing with inert hydrocarbon.

Transition metal halides which are present in the mixture of (b) prior to removal of unreacted alkyl halides and aryl halides include transition metal compounds such as the halides, chlorides, bromides, and iodides of the transition metals of Groups IVb, Vb, VIb, VIIb, VIII of Mendeleev's Periodic Table of Elements as set forth in Handbook of Chemistry and Physics, CRC, 48th Edition (1967–68). Such metals include, for example, titanium, chrominum, zirconium, vanadium, tungsten, manganese, molybdenum, ruthenium, rhodium, cobalt, and nickel; with titanium, vanadium and zirconium either separately or in combination being preferred. Exemplary preferred transition metal compounds are titanium tetrachloride, titanium trichloride, zirconium tetrachloride, vanadium tetrachloride, vanadium pentachloride, vanadium oxychloride with the halides, particularly the chlorides, of titanium being most preferred.

The final step in the preparation of the catalyst of the present invention are adding alkylating agents (or co-catalysts) to form the polymerization catalyst. The term "alkylating agent" is used to indicate co-catalysts containing alkyl groups or aryl groups such as phenyl. These materials, such as phenyl magnesium bromide, can be used in the present invention. It is only necessary that a titanium-to-carbon bond be present. The presence of such bonds form the intended use of the term "alkylating agent".

These alkylating agents are organometallic compounds which are halides, hydrides, or totally alkylated derivatives of the metals of Groups Ia, IIa, IIb or IIIa of the Periodic Table such as, for example, triisobutyl aluminum, triethyl aluminum, diethylaluminum chloride, ethylmagnesium bromide, diisobutylaluminum hydride, mixtures thereof and the like, so as to provide a metal (Group Ia, IIa, IIb or IIIa): transition metal atomic ratio of from about 1:1 to about 200:1, preferably from about 10:1 to about 30:1.

Aluminum alkyls are the preferred alkylating agents of the present invention followed closely by boron, magnesium and zinc alkyls. Other metals are likewise useful but are less preferred.

In the preparation of the catalyst of the present invention it is preferred to carry out such preparations in the presence of an inert diluent, although such is not necessary. Representative of but not exhaustive of suitable inert organic diluents are ethane, propane, isobutane, $n$-butane, $n$-hexane, isomeric hexanes, isooctane, isononane, paraffinic mixtures of alkanes having from 8 to 9 carbon atoms, cyclohexane, methyl cyclopentane, dimethylcyclohexane, dodecane, benzene, toluene, ethyl benzene, cumene, decalin, industrial solvents comprising saturated or aromatic hydrocarbons such as kerosene, naphthas, and mixtures of any of the foregoing, especially when free of impurities known to poison Ziegler catalysts. Especially useful are those inert diluents having boiling points in the range of $-50°$ C. to about 200° C.

The present invention is more concretely described with reference to the examples below wherein all parts and percentages are by weight unless otherwise specified. The examples are provided to illustrate the present invention and not to limit it.

EXAMPLE 1

A catalyst preparation was carried out wherein a transition metal was added to the formed Grignard reagent. A composite powder (3.8378 grams), containing magnesium chloride and 6.63% magnesium metal, was placed in a 100-milliliter (ml) flask in the absence of air and water. Oxygen-free anhydrous hexane (40 ml) was placed in the flask, and formed a slurry upon through agitation. The slurry was allowed to settle. One crystal of iodine ($I_2$) was placed in the flask in order to promote Grignard reagent formation. Freshly distilled 1-chlorobutane (1.10 ml) in 30 ml hexane was slowly added to the reaction flask over 30 minutes under an atmosphere of argon. The reaction was refluxed for 1 hour with vigorous stirring and then cooled to 2° C. under an atmosphere of dry argon. Titanium tetrachloride (1.343 ml; 1.2 equivalence based on magnesium metal) was added to the slurried Grignard reagent/$MgCl_2$ composite over 2.9 hours. The reaction was then heated to reflux for one hour, then cooled to ambient temperature. The slurry was washed repeatedly with oxygen-free anhydrous hexane until the supernatant gave a negative test for titanium. Analysis of the slurried catalyst indicated the titanium concentration to be 0.53 mg titanium per ml slurry.

EXAMPLE 2

A catalyst preparation was carried out wherein the formed Grignard reagent was added to the transition metal compound. A composite powder (5.1153 grams), containing magnesium dichloride and 6.63% magnesium metal, was placed in a 100 ml flask in the absence of air and water. Oxygen-free anhydrous hexane (20 ml) was placed in the flask to form a slurry upon agitation. The slurry was allowed to settle. One crystal of iodine ($I_2$) was placed in the flask to promote the formation of the Grignard reagent. Freshly distilled 1-chlorobutane (1.70 ml) in 40 ml hexane was added to the reaction flask over 1.25 hours. The reaction was heated to reflux for 1.5 hours then cooled to 1° C. The slurry was added over 5 minutes to a hexane (100 ml) solution of titanium tetrachloride (1.7 ml; 1.1 equivalent based on magnesium metal) which had been cooled to 0° C. The resulting slurry was allowed to warm to ambient temperature over 15 minutes, then heated to reflux for 1.5 hours. The cooled slurry was thoroughly washed with oxygen-free anhydrous hexane until the supernatant gave a negative test for titanium.

In a polymerization process employing the catalyst of the present invention, polymerization is effected by simply adding a catalytic amount of the catalyst composition to a polymerization zone. The polymerization zone will normally be maintained at temperatures in the range of from about 0° C. to about 300° C., preferably at a polymerization temperature of from about 30° C. to about 100° C. Normally the polymerization will be carried out for a period of time ranging from about 5 minutes to several hours, generally from about 15 minutes to about 5 hours. These polymerizations should be carried out in the absence of moisture and oxygen, as there are known catalyst poisons. A catalytic amount of the catalyst composition is generally understood to mean that amount ranging from about $1 \times 10^{-4}$ to about 1 milligram atom of transition metal per liter of diluent. The most advantageous catalyst concentrations depend, however, on polymerization conditions such as temperature, pressure, solvent, and level of catalyst deactivators.

Polymerizations utilizing the catalyst of the present invention will normally be carried out at pressures of from about 0 to about 500 pounds per square inch gauge (psig). Normally, the polymerizations will occur in the presence of agitation to ensure thorough contacting of the monomer with the catalyst.

Hydrogen can be used as is known in the art in the practice of the present invention to control molecular weight of any resultant polymer. Normally hydrogen is used at levels of from about $1 \times 10^{-3}$ moles per mole of monomer to about 1 mole per mole of monomer. Hydrogen can be added with a monomer stream to the polymerization vessel, or can be separately added to the vessel before, after or during addition of the monomer to the polymerization vessel. Hydrogen is normally added during or before addition of the catalyst.

EXAMPLE 3

The catalyst prepared in Example 1 was used in a polymerization reaction. A glass reactor was charged with 400 ml oxygen-free, anhydrous hexane and 20.01 ml of aluminum triethyl (24.7% solution in heptane). The reactor was equilibrated to 60° C. under constant agitation and 1 atmosphere gaseous 1-butene. The polymerization was initiated by charging the catalyst (containing 0.055 mmoles titanium) to the reactor. After 1.0 hour the polymerization was terminated by disconnecting the 1-butene feed to the reactor, then removing the reactor from heat followed by injecting 5.0 ml of isopropyl alcohol into the reactor. Precipitation of the polymer was accomplished by adding the total contents of the reactor into 1-liter of isopropyl alcohol. The polymer was isolated and dried to give 3.89 grams of white resin.

EXAMPLE 4

The catalyst prepared in Example 2 was used in a polymerization reaction. A glass reactor was charged with 300 ml oxygen-free, anhydrous hexane, aluminum triethyl (7.1 ml; 24.7% in solution in heptane) and 2.2 moles of methyl-p-toluate. The catalyst (0.38 mmoles titanium) was added as a powder. The reactor was heated to 63° C. under constant agitation. 1-Butene was inroduced into the reactor as a gas (22 psig). After 60 minutes the polymerization was terminated by remvoving the butene feed and injecting isopropyl alcohol into the reactor. The reactor contents were added to 1-liter of isopropyl alcohol. The polymer was isolated to yield 5.5 gram dry resin. A control polymerization with Stauffer TiCl$_3$.$\frac{1}{3}$AlCl$_3$ (0.93 mmoles titanium) and di-ethyl aluminum chloride co-catalyst gave 8.81 grams dry resin.

Thus it can be seen that the present invention provides an improved method for preparing a catalyst for the polymerization of olefins. The method relies upon the reaction of magnesium metal with an organic halide or halides to yield a dialkyl magnesium composition, magnesium dihalide and unreacted magnesium metal, separating the magnesium dihalide and magnesium metal from the dialkyl magnesium composition, treating the magnesium dichloride and magnesium metal with alkyl halides or aryl halides to form an organometallic substance in situ, then adding transition metal halides to the mixture, allowing reaction to occur and removing any unreacted alkyl halides or aryl halides, followed by adding a co-catalyst to form the polymerization catalyst of the present invention.

While certain embodiments and details have been shown for the purpose of illustrating this invention, it will be apparent to those skilled in this art that various changes and modifications may be made without departing from the spirit or scope of the invention.

We claim:

1. A method for forming a supported activated catalyst for olefin polymerization comprising
    (a) reacting magnesium metal with an organic halide or halides to yield a dialkyl magnesium composition, magnesium dihalide and unreacted magnesium metal;
    (b) separating the magnesium dihalide and magnesium metal from the dialkyl magnesium composition in the substantial absence of oxygen and moisture, then treating the magnesium dichloride and magnesium metal with alkyl halides or aryl halides or mixtures of these to form an organometallic substance in situ;
    (c) adding transition metal halides to the mixture of (b) or adding (b) to transition metal halides, allowing reaction to occur and removing unreacted alkyl and aryl halides as well as unreacted transition metal halides before
    (d) adding alkylating agents to form a polymerization catalyst.

2. A method as described in claim 1 wherein step (b) is carried out in the presence of excess alkyl halides or aryl halides.

3. A method as described in claim 2 wherein the excess alkyl halides of (b) are normal or branched paraffin halides containing from 1 to 30 carbon atoms.

4. A method as described in claim 3 wherein the excess halides are alkyl halides.

5. A method as described in claim 4 wherein the halides of step (b) are selected from the group consisting of allyl bromide, allyl chloride, benzyl bromide, benzyl chloride, 1-bromobutane, 2-bromobutane, 1-bromodecane, 3-bromodecane, bromoethane, 1-bromoheptane, 1-bromohexane, 1-bromopentane, 2-bromopentane, 1-bromopropane, 2-bromopropane, 1-chlorobutane, 2-chlorobutane, 1-iodobutane, 1-iodopropane, 2-iodopropane, vinyl bromide, o-bromoanisole, m-bromoanisole, p-bromoanisole, 9-bromoanthracene, 4-bromotoluene, 2-bromo-m-xylene, 4-bromo-m-xylene, 2-bromo-p-xylene, 3-bromo-o-xylene, 4-bromo-o-xylene, chlorobenzene, cyclopentylbromide, cyclopentylchloride, and cyclopropylbromide.

6. A method as described in claim 1 wherein the transition metal halides are chlorides, bromides and iodides of the transition metals of groups IVb, Vb, VIB, VIIb and VIII.

7. A method as described in claim 6 wherein the metals are selected from the group consisting of titanium, chromium, zirconium, vanadium, tungsten, manganese, molybdenum, ruthinium, rhodium, cobalt and nickel.

8. A method as described in claim 7 wherein the halide is chloride.

9. A method as described in claim 1 wherein the reaction of (a) takes place at a temperature of from about 20° C. to about 200° C.

10. A method as described in claim 9 wherein excess alkyl or aryl halides are removed by filtration followed by washing with inert hydrocarbons.

11. A method as described in claim 10 wherein the solids of (b) can be separated by filtration or decantation.

* * * * *